(12) United States Patent
Adkins et al.

(10) Patent No.: US 8,476,890 B2
(45) Date of Patent: Jul. 2, 2013

(54) CIRCUITS AND METHODS FOR CONTROLLING A SWITCHING REGULATOR BASED ON A DERIVED INPUT CURRENT

(75) Inventors: Kenneth C Adkins, Mason, OH (US); Anurag Kaplish, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 989 days.

(21) Appl. No.: 12/026,497

(22) Filed: Feb. 5, 2008

(65) Prior Publication Data
US 2009/0195230 A1 Aug. 6, 2009

(51) Int. Cl.
*G05F 1/00* (2006.01)
(52) U.S. Cl.
USPC .......................................... 323/285
(58) Field of Classification Search
USPC .................... 323/282, 283, 284, 285, 286
See application file for complete search history.

(56) References Cited

U.S. PATENT DOCUMENTS

| | | | |
|---|---|---|---|
| 7,183,757 B2* | 2/2007 | Nagai ............................ | 323/285 |
| 7,339,360 B2* | 3/2008 | Chen et al. .................... | 323/284 |
| 7,474,083 B2* | 1/2009 | Yoshikawa ..................... | 323/282 |
| 7,541,797 B2* | 6/2009 | Dequina et al. ................ | 323/316 |
| 7,564,706 B1* | 7/2009 | Herbert .......................... | 363/124 |
| 7,570,036 B2* | 8/2009 | Tang et al. ..................... | 323/283 |
| 2005/0189916 A1* | 9/2005 | Bucur ............................ | 320/128 |
| 2005/0219870 A1* | 10/2005 | Yang et al. ................. | 363/21.01 |
| 2006/0006850 A1* | 1/2006 | Inoue et al. .................... | 323/265 |
| 2006/0132061 A1* | 6/2006 | McCormick et al. .......... | 315/291 |
| 2006/0220627 A1* | 10/2006 | Koh .............................. | 323/282 |
| 2006/0255782 A1* | 11/2006 | Sugiyama et al. ............. | 323/282 |
| 2008/0172202 A1* | 7/2008 | Nakazato ....................... | 702/151 |

OTHER PUBLICATIONS

Intersil, "Basic Analog for Digitial Designers", Ocotber 19, 2004. http://www.intersil.com/data/an/an9510.pdf.*

* cited by examiner

*Primary Examiner* — Adolf Berhane
*Assistant Examiner* — Jeffrey GBlende
(74) *Attorney, Agent, or Firm* — Fountainhead Law Group (57) ABSTRACT

In one embodiment the present invention includes a method of controlling a switching regulator based on a derived input current. In one embodiment, an output current of said switching regulator is detected and used to generate a first voltage or current signal corresponding to the output current. Additionally, a switching signal of said switching regulator is detected and used to generate a second voltage or current signal corresponding to the switching signal. The resulting signals may be combined to produce a voltage or current signal corresponding to an input current of said switching regulator. The switching signal may be modified based on the derived voltage or current signal and used to control the system.

21 Claims, 7 Drawing Sheets

CIRCUITS AND METHODS FOR CONTROLLING A SWITCHING REGULATOR BASED ON A DERIVED INPUT CURRENT

BACKGROUND

The present invention relates to switching circuits, and in particular, to circuits and methods for controlling a switching regulator.

Switching regulators are circuits that receive an input voltage and produce an output voltage having different characteristics than the input. Example switching regulators include AC to DC switching regulators and DC to DC switching regulators. AC to DC switching regulators receive an AC signal and transform the AC signal into a DC signal. DC to DC switching regulators receive a DC voltage and transform the DC voltage into another DC voltage. For instance, a DC-DC converter may receive a voltage (e.g., 5 volts) and output a higher voltage (e.g., 10 volts). These DC-DC converters are referred to as "Boost" converters. Other DC-DC converters may receive a voltage (e.g., 5 volts) and output a lower voltage (e.g., 2.5 volts). These DC-DC converters are referred to as "Buck" converters.

Switching regulators are advantageous because they have a high efficiency. In other words, the amount of power (i.e., voltage and current) received at the input of the switching regulator is efficiently transferred to the output of the regulator to generate transformed voltage or current. Typically, switching regulators include one or more switching devices, such as a switching transistor, that is turned on and off in a controlled manner to efficiently transfer energy into an energy storage device, such as an inductor. The characteristics of the switching signal are changed in a controlled manner so that the switching regulator performs as desired. This is often accomplished by monitoring a parameter at the input or output terminal of the switching regulator (such as voltage or current) and modifying the switching signal to maintain the parameter at a constant value.

In many applications it is desirable to monitor the input current to the input terminal of a switching regulator, and control the switching regulator using the input current as a parameter (e.g., alone or together with other parameters). However, one problem with monitoring the input current is that additional circuitry may be required to sense the input current. Additionally, it may be desirable to monitor the input current and control the switching regulator as other parameters, such as output current or output voltage, for example, change over time. The most common approach to monitoring the input current is to include a resistor at the input of the switching regulator. As the input current flows through the resistor and into the switching regulator input, a voltage will appear across the resistor. This voltage may be sensed and used as a control parameter corresponding to the input current to control the circuit. However, power is dissipated as the input current flows through the resistor. This results in an undesirable reduction in the efficiency of the switching regulator.

Thus, there is a need for improved techniques for determining the input current of a switching regulator. More generally, there is a need for improved techniques for controlling switching regulators. The present invention solves these and other problems by providing circuits and methods for controlling a switching regulator.

SUMMARY

In one embodiment, the present invention includes a method of controlling a switching regulator based on a derived input current. In one embodiment, an output current of said switching regulator is detected and used to generate a first voltage or current signal corresponding to the output current. Additionally, a switching signal of said switching regulator is detected and used to generate a second voltage or current signal corresponding to the switching signal. The resulting signals may be combined to produce a voltage or current signal corresponding to an input current of said switching regulator. The switching signal may be modified based on the derived voltage or current signal and used to control the system.

The following detailed description and accompanying drawings provide a better understanding of the nature and advantages of the present invention.

DETAILED DESCRIPTION

Described herein are circuits and methods for controlling a switching regulator. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
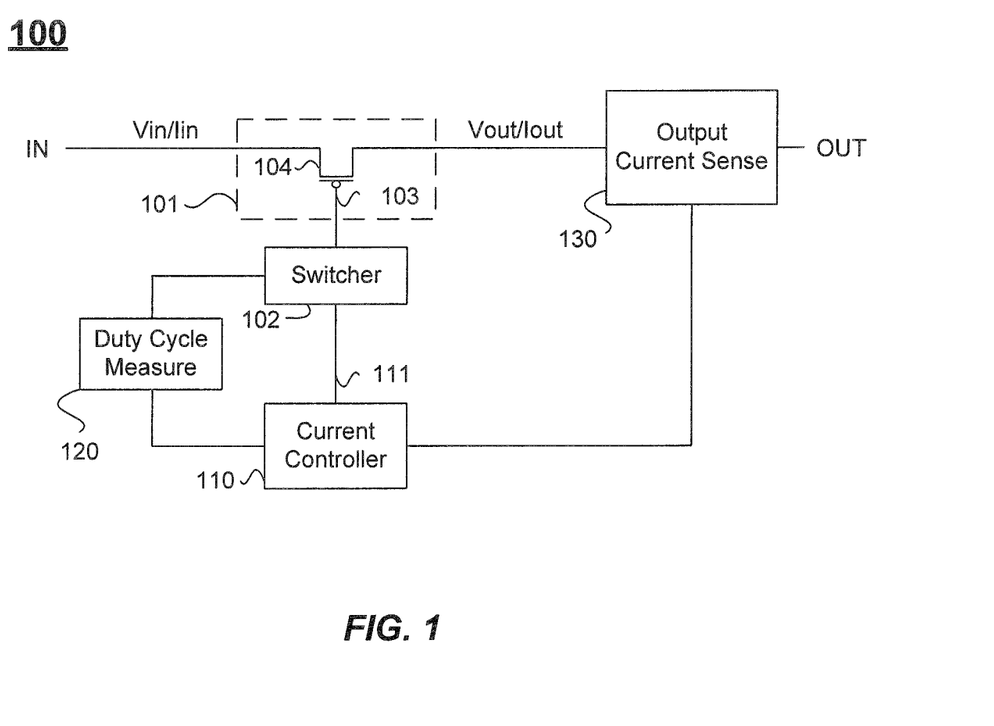
FIG. 1 illustrates an electronic circuit including a switching regulator according to one embodiment of the present invention.

FIG. 1 illustrates an electronic circuit including a switching regulator according to one embodiment of the present invention. Circuit 100 includes a switching block 101, a switcher 102, an output current sense circuit 130, a duty cycle measurement circuit 120, and a current controller 110. The switching block 101 illustrates an example transistor 104 having a gate terminal coupled to switcher 102, an input terminal coupled to the input of the switching regulator ("IN"), and an output terminal coupled to the output of the switching regulator ("OUT") through output current sense circuit 130. A switching regulator may include switcher 102 to generate a switching signal, such as a pulse width modulated signal, for example. The switching signal is coupled to one or more switching transistors to turn the transistors ON and OFF, and thereby deliver power between the input and output of the regulator. While a single switching transistor is shown for illustration, it is to be understood that switching regulators according to different embodiments of the present may include more than one transistor depending on the particular switching regulator architecture used, and such transistor may or may not be coupled between the input and output as shown here.

The switching signal is coupled to a duty cycle measure circuit 120. Duty cycle measure circuit 120 detects the switching signal and generates a voltage or current signal corresponding to the switching characteristics of the switching signal (e.g., the duty cycle). The output of the duty cycle measure circuit 120 is coupled to a current controller 110 and the voltage or current signal corresponding to the duty cycle of the switching signal from circuit 120 is provided as an input to controller 110.

The output current of the switching regulator is coupled through an output current sense circuit 130. The output current sense circuit 130 detects the output current of the switching regulator and generates another voltage or current signal corresponding to the output current. The output of circuit 130 is also coupled to current controller 110 and the voltage or current signal corresponding to the output current from circuit 130 is provided as an input to controller 110.

Current controller 110 receives the voltage or current signal corresponding to the duty cycle of the switching signal from circuit 120 and the voltage or current signal corresponding to the output current from circuit 130 and combines the signals to produce another voltage or current signal corresponding to an input current of said switching regulator. In particular, the input current is related to the output current and duty cycle as follows:

$$Iin = Iout * D$$

Accordingly, by generating signals corresponding to the duty cycle and the output current, a signal corresponding to the input current may be derived so that the input current may be used as the control parameter for the switching regulator without directly sensing the input current. The generated input current signal is provided at the output of the current controller 110, which is coupled to the control input of switcher 102 as shown by signal path 111. Accordingly, a signal corresponding to the input current is used to control the switching regulator. For instance, the switching signal may be modified based on a voltage or current related to the input current. For example, if a constant input current is desired in a DC/DC converter system, in an architecture where a switching transistor is coupled between the input and output, the duty cycle of the switching signal may be decreased if the derived input current increases, and alternatively, increased if the derived input current decreases.

Figure 2:
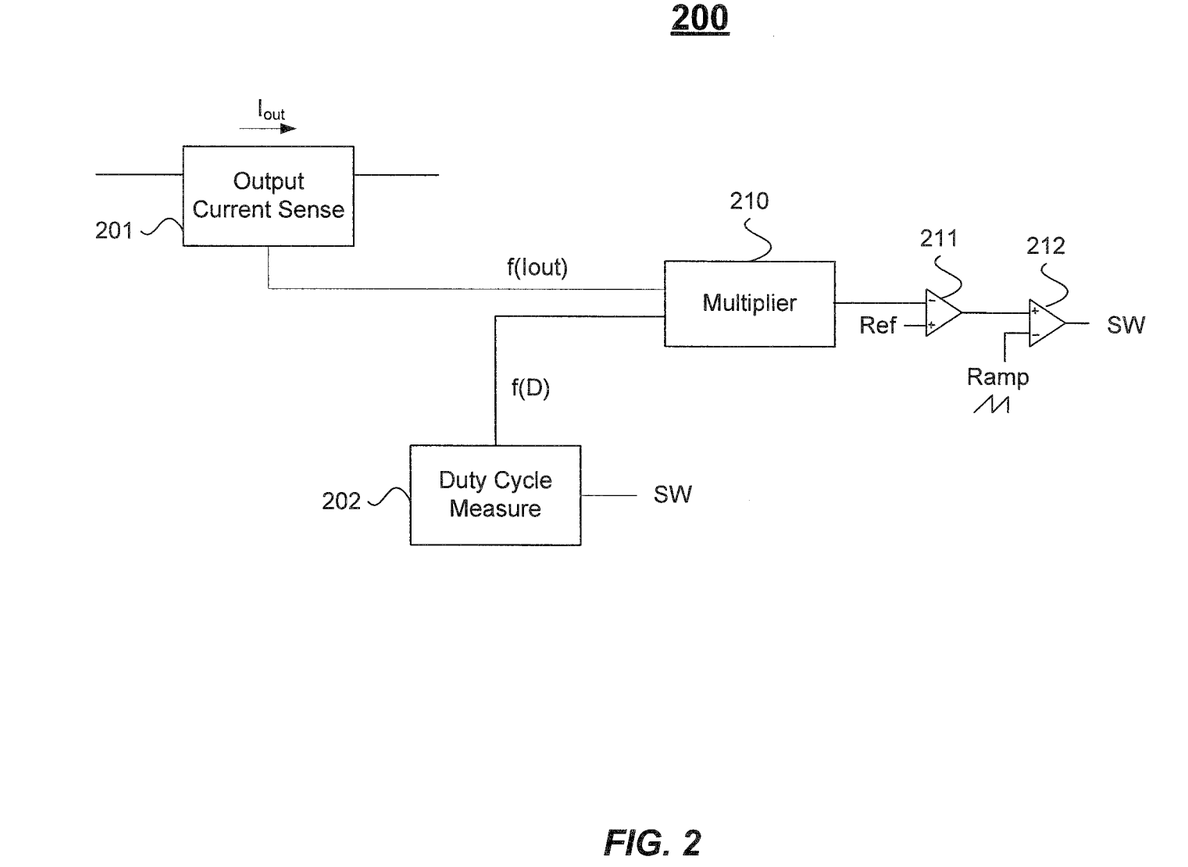
FIG. 2 illustrates an example of controlling a switching regulator according to one embodiment of the present invention.

FIG. 2 illustrates an example of controlling a switching regulator according to one embodiment of the present invention. Circuit 200 illustrates a control loop for controlling a switching regulator based on a signal corresponding to the input current. Output current Iout is sensed by output current sense block 201. The output voltage or current from block 201 is a function of Iout (i.e., f(Iout)). Similarly, switching signal SW is received by duty cycle measure circuit 202. The output voltage or current from circuit 202 is a function of the duty cycle (i.e., f(D)). Both f(Iout) and f(D) may be functions of other variables as well, but such variables may be maintained as constants or otherwise controlled. In one embodiment, the means for combining the first signal corresponding to the output current of the switching regulator and the second signal corresponding to the duty cycle of the switching signal is a multiplier 210. Multiplier 210 produces a voltage or current signal corresponding to an input current of said switching regulator. The output of multiplier 210 may be coupled in a loop to control the characteristics of the switching signal. For example, here the output of multiplier 210 is a voltage, which is compared to a reference voltage ("REF") in differential amplifier 211. The output of circuit 211 is coupled to one input another differential circuit 212, which may be a comparator, for example. The other input of differential circuit 212 is coupled to a ramp signal ("RAMP") or other sawtooth waveform. When the voltage of the ramp signal is above the output voltage from circuit 211, then output voltage of circuit 212 is low, and when the voltage of the ramp signal is below the output voltage from circuit 211, then output voltage of circuit 212 is high. Accordingly, if the output voltage of circuit 211 increases or decreases, the duty cycle of the switching signal changes. Since the output voltage of circuit 211 is a function of the input current, derived from the duty cycle and output current, the circuit is effectively controlled by the input current.

Figure 3:
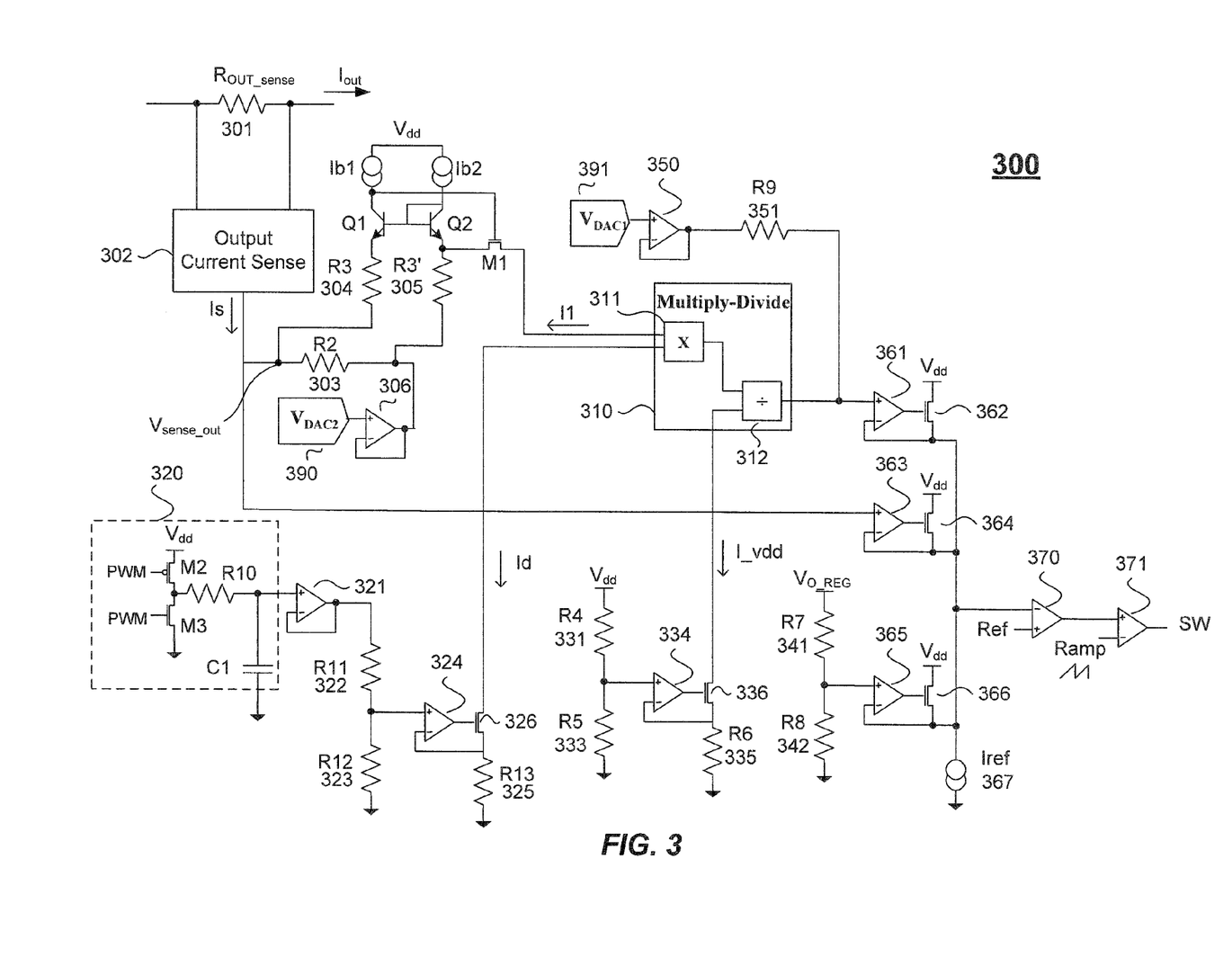
FIG. 3 illustrates an example of a switching regulator according to one embodiment of the present invention.

FIG. 3 illustrates an example of a switching regulator according to one embodiment of the present invention. In this example, the output current Iout is coupled through a resistor 301 ("Rout_sense") to generate a voltage across the resistor. The voltage across the resistor is received by an output current sense circuit 302, which generates a current Is corresponding to the output current Iout. The current sense circuit 302 may include one or more internal resistors R1 as described below such that current Is is as follows:

$$Is = Iout * Rout\_sense / R1$$

Current Is may be coupled to resistor 303 ("R2") and resistor 304 ("R3"). An amplifier (not shown) may be used to buffer the current Is into resistor 304, for example. The voltage on the terminal of resistor 303 is set by Is, which corresponds to the output current. This voltage ("Vsense_out") may be coupled to differential amplifier 363 for controlling the regulator based on output current as described in more detail below. The other terminal of resistor 303 is coupled to a digital-to-analog converter 390 having a voltage output ("Vdac2") through buffer circuit 306. Converter 390 sets the maximum output current for the system. In other words, if Is and Vsense_out increase above a certain predetermined value, which is set by the voltage at the output of converter 390, amplifier 363 will take over control of the loop and the system will be controlled by the output current.

The circuit comprising resistor 304 ("R3"), resistor 305 ("R3'"), transistors Q1 and Q2, current sources Ib1 and Ib2, and transistor M1, generates a current I1, which is a scaled version of Is as follows:

$$I1 = Is * R2 / R3$$

$$I1 = Iout(Rout\_sense * R2) / (R1 * R3)$$

Where R3=R3'. In some applications, buffers may be included at the inputs to the terminals of resistors R3 and R3' to reduce the current into these resistors from the terminals of resistor R2. Accordingly, this circuit illustrates an example of a circuit for generating a current corresponding to the output current.

Similarly, circuit 300 includes an example circuit for generating a current corresponding to the duty cycle of a switching signal. Here, the switching signal is a pulse width modulated ("PWM") signal. In this example, the PWM signal is buffered by an inverter and filtered at 320. The filtering translates the duty cycle into a voltage as described below. In particular, the PWM signal is coupled to two transistors M3 and M2, respectively, which are coupled in series between a supply voltage and another reference voltage (here, ground). PWM signal is coupled to the gate of NMOS transistor M3 and the gate of PMOS transistor M2. One terminal of M2 is coupled to a supply Vdd, and the other terminal of M2 is coupled to a node between M2 and M3. Similarly, one terminal of M3 is coupled to the node between M2 and M3 and the other terminal of M3 is coupled to ground. It will be recognized by those skilled in the art that M2 and M3 are configured as an inverter. In this example, having "PWM" drive both M3 and M2 is one example that is valid for switchers that do not go into a discontinuous mode (i.e., where both hi-side and lo-side output drivers are off). Another embodiment is the case where discontinuous mode is allowed, where the M2 and M3 drivers will not be exactly the same signal. In particular, the gate for M2 should be low (i.e. M2 is on) when the hi-side output driver is ON, and otherwise it should be high (M2 off). This signal may be designated PWM_HI (not shown in FIG. 3). Similarly, the gate for transistor M3 should be high (M3 on) when the lo-side output driver is ON, and otherwise it should be low (M3 off). This signal may be designated PWM_LO (not shown in FIG. 3). Such an arrangement allows for the discontinuous case in which both output drivers may be OFF at the same time. For discontinuous mode, the PWM signal may be conditioned to produce the PWM_HI and PWM_LO signals before being coupled to the gates of M2 and M3. The intermediate node (i.e., the output node of the inverter) is coupled to the input of a filter. The filter comprises a resistor and a capacitor (i.e., an RC filter). In this example, the RC filter is the means for determining the duty cycle. Resistor R10 has a one terminal coupled to the intermediate node between M2 and M3. The other terminal of resistor R10 is coupled to a terminal of capacitor C1. The other terminal of capacitor C1 is coupled to ground. The output of the filter is at the node between R10 and C1.

If the PWM signal is at a high voltage, M3 will turn ON and M2 will turn off, and one terminal of R10 will be coupled to ground. When the PWM signal is at a low voltage, M2 will turn on and M3 will turn off, and the terminal of R10 will be increased to the supply voltage Vdd. The PWM signal contains the duty cycle information. For example, the output of the inverter is a square wave, so the filter used to allow the DC value (D*Vdd) to pass through. Therefore, the average value at the output of the inverter will be as follows:

$$Vo\_filter = D*Vdd.$$

The output of the filter is coupled to a buffer circuit comprising an amplifier 321, which may be configured as a unity gain amplifier. The voltage at the output of amplifier 321 may be divided by resistors 322 ("R11") and 323 ("R12"). This voltage in turn may be translated into a current corresponding to the duty cycle using amplifier 324, transistor 326, and resistor 325. The resulting current Id corresponds to the duty cycle as follows:

$$Id = n*D*Vdd/R13$$

where "n" is a scale factor of the divider (i.e. R12/(R11+R12).

In this example, current Id is combined with current I1 in multiplier circuit 311. From the above equations, it can be seen that the current signal provided to one input of the multiplier is linearly related to the output current. In this example, the current signal is proportional (i.e., y=mx) to the output current. Similarly, the current signal provided to the other input of the multiplier is linearly related to the duty cycle. In this example, the current signal is proportional to the duty cycle. A linear or proportional relationship is one example of a correspondence between the signals that may be used to determine the input current according to the techniques described herein. The output of multiplier circuit is a signal corresponding to the input current as follows:

$$Io\_mult = I1*Id = [Iout(Rout\_sense*R2)/(R1*R3)]$$
$$[n*D*Vdd/R13] = K*Iout*D,$$

where K may be considered a relative constant. From the above equation it can be seen that the output signal Io_mult, which may be a current or a voltage depending on the implementation of the multiplier circuit and divider circuit describe below, is a measure of the input current. The precise input current can be determined based on the values of the components comprising K (e.g., resistor values).

In some applications, the supply voltage Vdd may vary, thereby influencing the determination of the input current. Therefore, in this example, the influence of the supply voltage Vdd on the output signal of multiplier 311 corresponding to an input current of said switching regulator may be eliminated by dividing the multiplier output signal by another signal corresponding to the supply voltage. In this example, the supply voltage is divided by resistors 331 and 333 and converted into a current using amplifier 334, transistor 336 and resistor 335 ("R6"). The resulting current I_vdd is given as follows:

$$I\_vdd = m*Vdd/R6,$$

where "m" is a scale factor of the divider (i.e. R5/(R4+R5). This current signal is coupled to one input of divider circuit 312. The other input of divider circuit 312 is coupled to the output signal from multiplier 311. The output of divider 312 is a current signal corresponding to the input current with the effect of Vdd canceled out as follows:

$$Io\_div = [Iout(Rout\_sense*R2)/(R1*R3)][n*D*Vdd/R13]/[m*Vdd/R6]$$

$$Io\_div = [Iout(Rout\_sense*R2)]*[n*D]*R6/[(R1*R3)*R13*m]$$

which is independent of Vdd. The current signal Io_div is coupled to resistor 351 ("R9") and thereby translated into a voltage signal, which corresponds to the input current. Accordingly, the output of divider circuit 312 is coupled to the non-inverting input of differential amplifier 361 to receive the voltage signal corresponding to the input current.

The voltage generated by the current at the output of divider 312 may be adjusted by a digital-to-analog converter 391 to control the input current limit of the switching regulator. For example, the other terminal of resistor R9 is coupled to a second digital-to-analog converter 391 through buffer circuit 350. Converter 391 generates an output voltage Vdac1, which may be used to set the maximum input current for the system. For example, for a given value of current flowing out of divider 312, there is a corresponding voltage at the input of amplifier 361. If the voltage at the non-inverting input of amplifier 361 increases above the voltage at the inverting output of amplifier 361, then transistor 362 will turn on and increase the voltage at the inverting input of amplifier 370. If the input current is at a particular level, the voltage at the non-inverting input of amplifier 361 may be above or below the voltage at the inverting input depending on the voltage generated by converter 391. Therefore, the voltage generated by the converter 391 sets the value of the input current that will trigger amplifier 361 to take over control of the loop. Accordingly, converter 391 may be used to set the maximum input current (i.e., current limit) above which the switching regulator is controlled to maintain a constant input current.

FIG. 3 further illustrates that the voltage at the output of the switching regulator Vo_reg may be used to control the system. The switching regulator output voltage is divided down by resistors 341 and 342. The divided voltage is coupled to the input of an amplifier 365. The outputs of amplifiers 361, 363, and 365 are coupled to the control inputs of transistors 362, 364, and 366, respectively. One terminal of each transistor 362, 364, and 366 is coupled to the supply voltage, Vdd, and the other terminal of each transistor is coupled together and to the input of amplifier 370. A constant reference current Iref is used to pull down the voltage of the common node. Accordingly, switching regulator may be controlled to maintain a constant output voltage Vo_reg using amplifier 365, a constant output current Iout using amplifier 363, which may be programmed by converter 390, or a constant input current using amplifier 361, which may be programmed by converter 391. Amplifier 370 and comparator 371 may be used to produce and vary the switching signal as described above.

Figure 4:
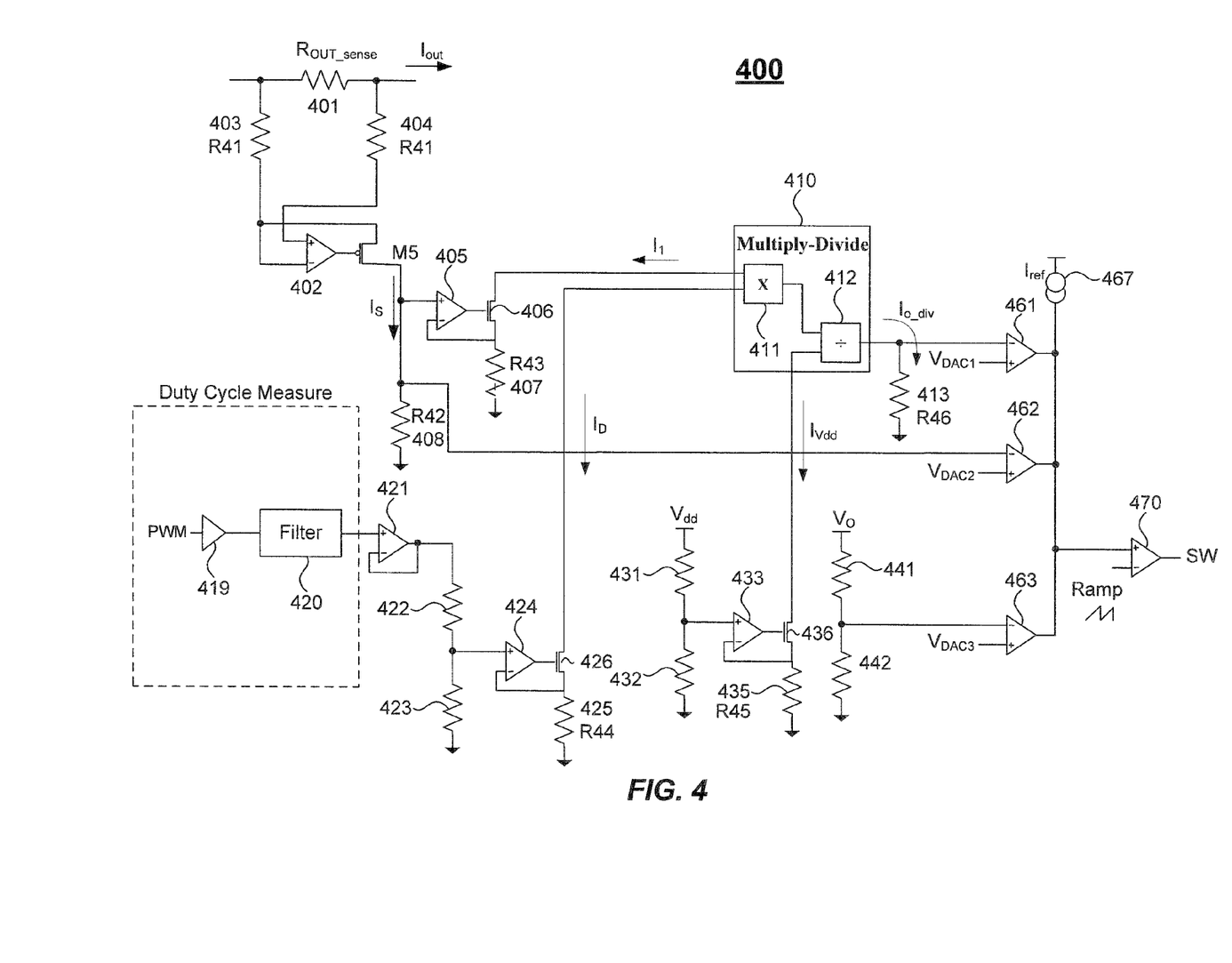
FIG. 4 illustrates an example of a switching regulator according to one embodiment of the present invention.

FIG. 4 illustrates an example of a switching regulator according to one embodiment of the present invention. In this example, the output current Iout is coupled through a resistor 401 ("Rout_sense") to generate a voltage across the resistor. The voltage across the resistor is received by an output current sense circuit 402, which generates a current Is corresponding to the output current Iout. In this example, current sense circuit 402 comprises two resistors 403 and 404 having approximately the same resistance value coupled to opposite terminals of the sense resistor 401. Resistor 403 is coupled to the inverting input of amplifier 402, and resistor 404 is coupled to the non-inverting input of amplifier 402. A PMOS transistor M5 has a control terminal coupled to the output of amplifier 402 and a terminal coupled to the inverting input of amplifier 402. The output of the current sense circuit is a current Is out of the second terminal of M5, which is a current corresponding to the input current. Current Is is received by resistor 408, which is coupled between the output of the current sense circuit and ground. The current Is into resistor 408 generates a voltage at the output of the current sense circuit. This voltage corresponds to the output current and may be coupled to the inverting input of differential amplifier 462 for controlling the switching regulator based on the level or value of the output current.

Current Is is also coupled to the non-inverting input of differential amplifier 405. Both amplifiers 405 and 462 may have high input impedances so that substantially all of Is flows into resistor 408. Amplifier 405, transistor 406, and resistor 407 convert the voltage across resistor 408 into another current I1, which may be coupled to multiplier circuit 411. Current signal I1, therefore, also corresponds to the output current.

Similarly, circuit 400 includes another example circuit for generating a current corresponding to the duty cycle of a switching signal. Here, the PWM signal is coupled to buffer 419, which may be an inverter, for example. However, discontinuous mode cases may use PWM_HI and PWM_LO signals as described above. The output of buffer 419 is coupled to filter 420. The filtering translates the duty cycle into a voltage as described above. The output of filter 420 is coupled though another buffer 421 (e.g., a unity gain amplifier) and to resistors 422 and 423, which divide the voltage at the output of buffer 421. The divided voltage in turn may be translated into a current corresponding to the duty cycle using amplifier 424, transistor 426, and resistor 425. The resulting current Id corresponds to the duty cycle as described above.

As mentioned above, the supply voltage Vdd may vary, thereby influencing the determination of the input current. Therefore, in this example, the influence of the supply voltage Vdd on the output signal of multiplier 411 corresponding to an input current of said switching regulator may be eliminated by dividing the multiplier output signal by another signal corresponding to the supply voltage. In this example, the supply voltage is divided by resistors 431 and 432 and converted into a current using amplifier 433, transistor 436 and resistor 435. The resulting current signal I_vdd is coupled to one input of divider circuit 412. The other input of divider circuit 412 is coupled to the output signal from multiplier 411. The output of divider 412 is a current signal corresponding to the input current with the effect of Vdd canceled out. Io_div is given as follows:

$$Io\_div = Iout*D*[n/m]*[(Rout\_sense*R42*R45)/(R41*R43*R44)]$$

The current signal Io_div is coupled to resistor 413 ("R46") and thereby translated into a voltage signal, which corresponds to the input current. Accordingly, the output of divider circuit 412 is coupled to the non-inverting input of differential amplifier 461 to receive the voltage signal corresponding to the input current.

FIG. 4 further illustrates that the voltage at the output of the switching regulator Vo_reg may be used to control the system. The switching regulator output voltage Vo is divided down by resistors 441 and 442. The divided voltage is coupled to the input of an amplifier 463. The non-inverting input of each amplifier 461, 462, and 463 is coupled to the output of a digital-to-analog converter, which may be individually programmed to output a voltage. Accordingly, the digital-to-analog converters may be programmed to output voltage Vdac1 for setting the maximum input current, Vdac2 for setting the maximum output current, or Vdac3 for setting the maximum output voltage. The outputs of amplifiers 461, 462, and 463 are coupled to the input of comparator 470 for controlling the switching regulator. A constant reference current Iref is used to pull up the voltage of the common node. Accordingly, the switching regulator may be controlled by either the input current derived from the output current and duty cycle as described above, the output current, or the output voltage.

Figure 5:
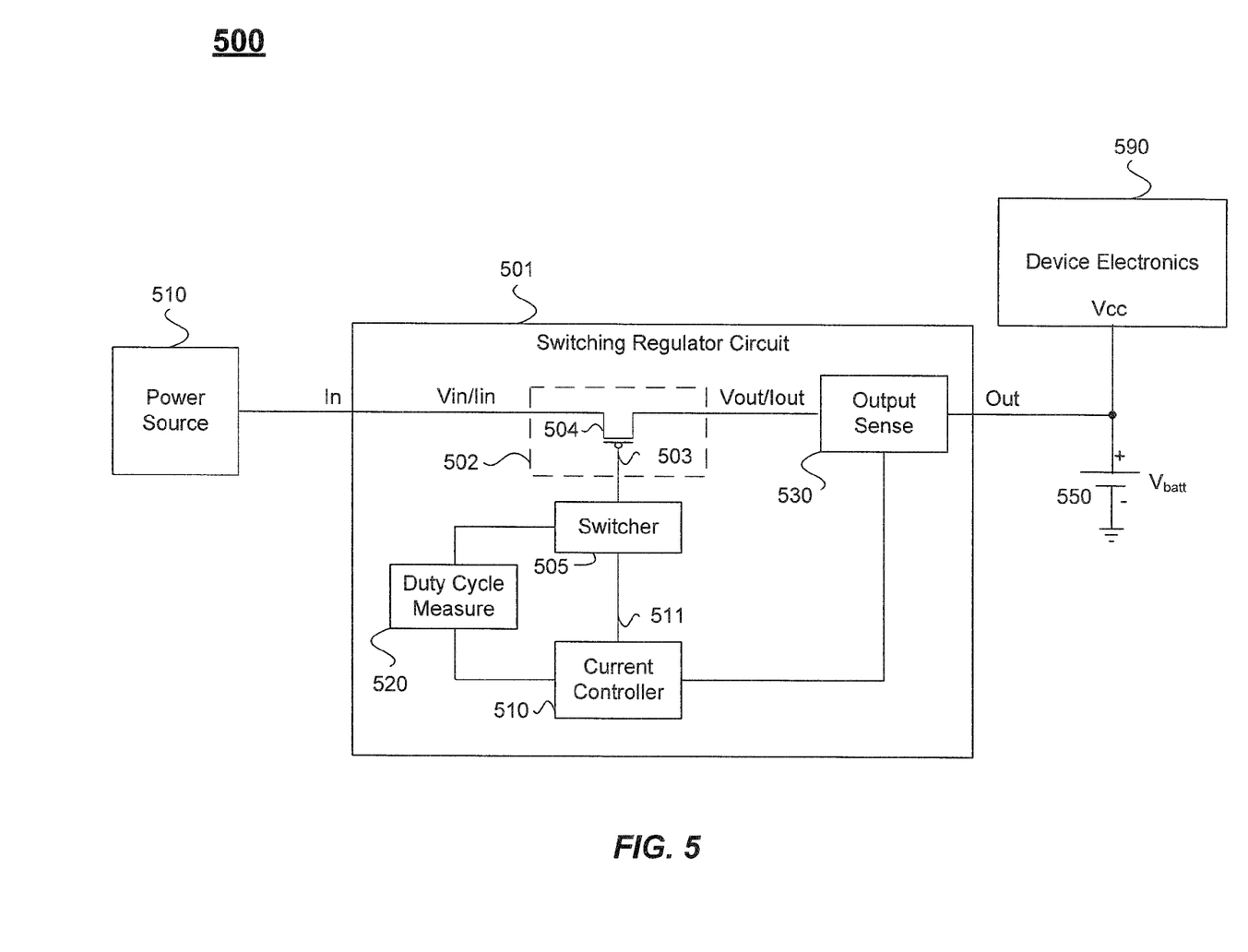
FIG. 5 illustrates an example of a switching regulator used as a battery charger according to one embodiment of the present invention.

FIG. 5 illustrates an example of a switching regulator used as a battery charger according to one embodiment of the present invention. Features and advantages of the present invention include charging a battery by controlling a switching regulator based on a variety of parameters such as output current, input current, or battery voltage. In this application, a device includes device electronics 590. The device electronics may include analog or digital electronics, or both, such as wireless electronics, amplifiers, regulators, or displays, for example, or microprocessors, microcontrollers, programmable logic, for example. The device electronics may be powered by battery 550. During operation of the electronic device, the device electronics draw current and battery may become depleted, which may result in the voltage on the battery dropping below its rated value. Power source 510 is coupled through a battery charging circuit 501 to the battery to recharge the battery. Battery charging circuit may include a switching regulator as described above for charging the battery based on output current, output voltage (i.e., battery voltage), or an input current determined from a switching signal and output current.

Switching battery charger 501 includes a switching block 502, a switcher 505, an output current sense circuit 530, a duty cycle measurement circuit 520, and a current controller 510. The switching block 502 includes a switching transistor 504 having a gate terminal 503 coupled to switcher 505, an input terminal coupled to the power source ("IN"), and an output terminal coupled to the battery ("OUT") through output current sense circuit 530. Switcher 505 generates a switching signal, such as a pulse width modulated signal, for example. The switching signal is coupled to one or more switching transistors to turn the transistors ON and OFF as described above. The operation of the switching system is as described above, and may be used to charge a battery while maintaining a constant output current, constant output voltage, or constant input current.

Figure 6:
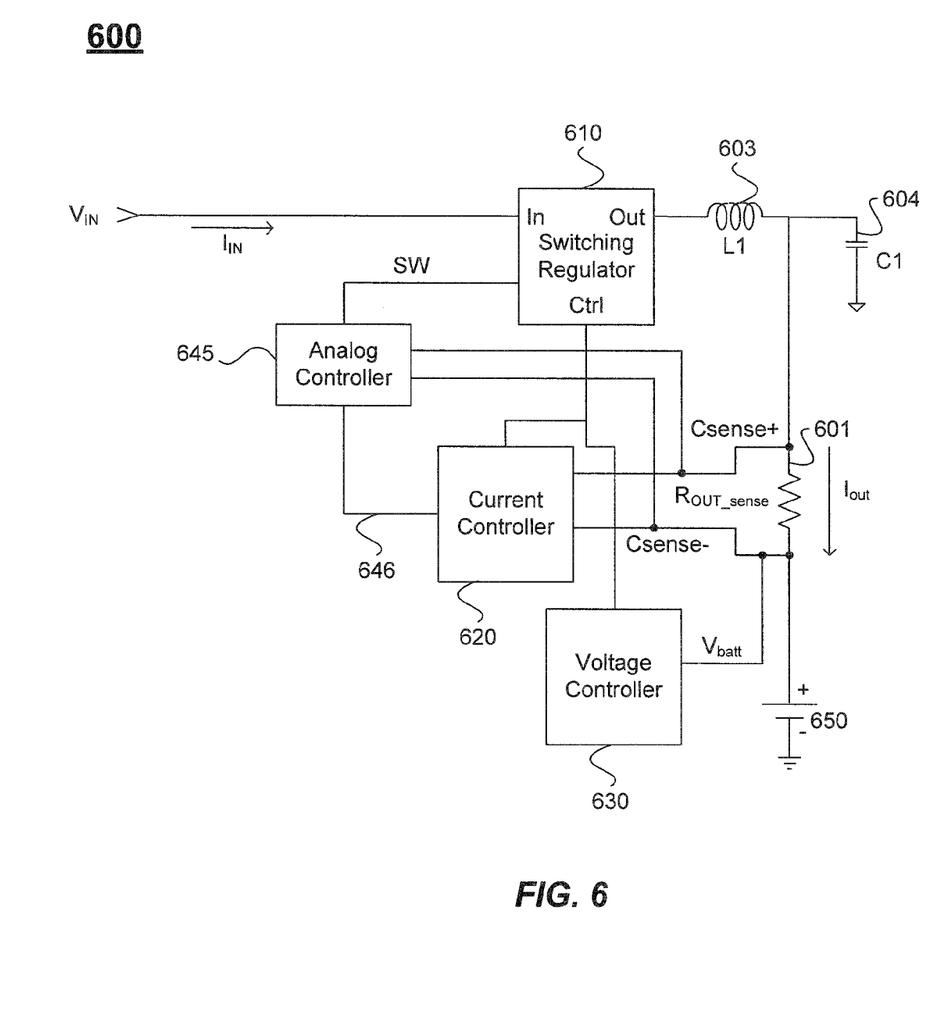
FIG. 6 illustrates an example of a switching regulator used as a battery charger according to one embodiment of the present invention.

FIG. 6 illustrates an example of a switching regulator used as a battery charger according to one embodiment of the present invention. This example illustrates one possible implementation using analog controller 645 for adjusting the battery current as the battery voltage increases automatically based on the output current and the duty cycle of the switching signal. Battery charger 600 includes a switching regulator 610 having an input for receiving voltage and current (Vin and Iin) from a power source. The output of switching regulator 610 is coupled to battery 650 through a filter comprising an inductor 603 and capacitor 604. Embodiments of the present invention may operate in a current control mode or voltage control mode. In current control mode, current controller 620 senses the output current and provides a control signal to a control input of switching regulator 610 for controlling the current sourced to the battery. In this example, a current sense resistor 601 is included in the current path to the battery, and current controller 620 has a first input coupled to a first terminal of current sense resistor 601 and a second input coupled to a second terminal of current sense resistor 601 for sensing the output current into the battery. Accordingly, the circuit may use the output current as a control parameter for charging the battery. Additionally, circuit 600 may charge the battery using the input current as a control parameter. For example, analog controller 645 may include a first input coupled to a first terminal of current sense resistor 601 and a second input coupled to a second terminal of current sense resistor 601 for sensing the output current into the battery. Analog controller 645 may further include an input for receiving switching signal SW. The output current signals and switching signals may be combined to produce a signal corresponding to the input current. Such a signal may be a voltage or current signals that is linearly related to the input current for example. This signal may be coupled to current controller 646 to control the switching regulator using the input current as a control parameter. For example, if the battery voltage is initially depleted (i.e., Vin>Vout), the switching regulator may be programmed to maintain a constant input current from a power supply and increase the output current automatically as voltage on the battery increases. Accordingly, current controller 620 may cause the switching regulator to generate a current into the battery that is greater than the current into the switching regulator. In other words, because Vin is greater than Vout when the battery is depleted and the transferred power (IinVin to IoutVout) is approximately the same (less efficiency losses) the output current may be larger than the input current. Current controller 620 may sense the input current to the battery and the control signal from analog controller 645, and the battery current may be reduced as the voltage on the battery increases. System 600 further includes a voltage controller 630 for the voltage control mode of a charge cycle. Voltage controller 630 includes a first input coupled to the terminal of the battery for sensing battery voltage. In voltage control mode, the output of voltage controller 630 generates a control signal to switching regulator 610 and uses the battery voltage as the control parameter.

Figure 7:
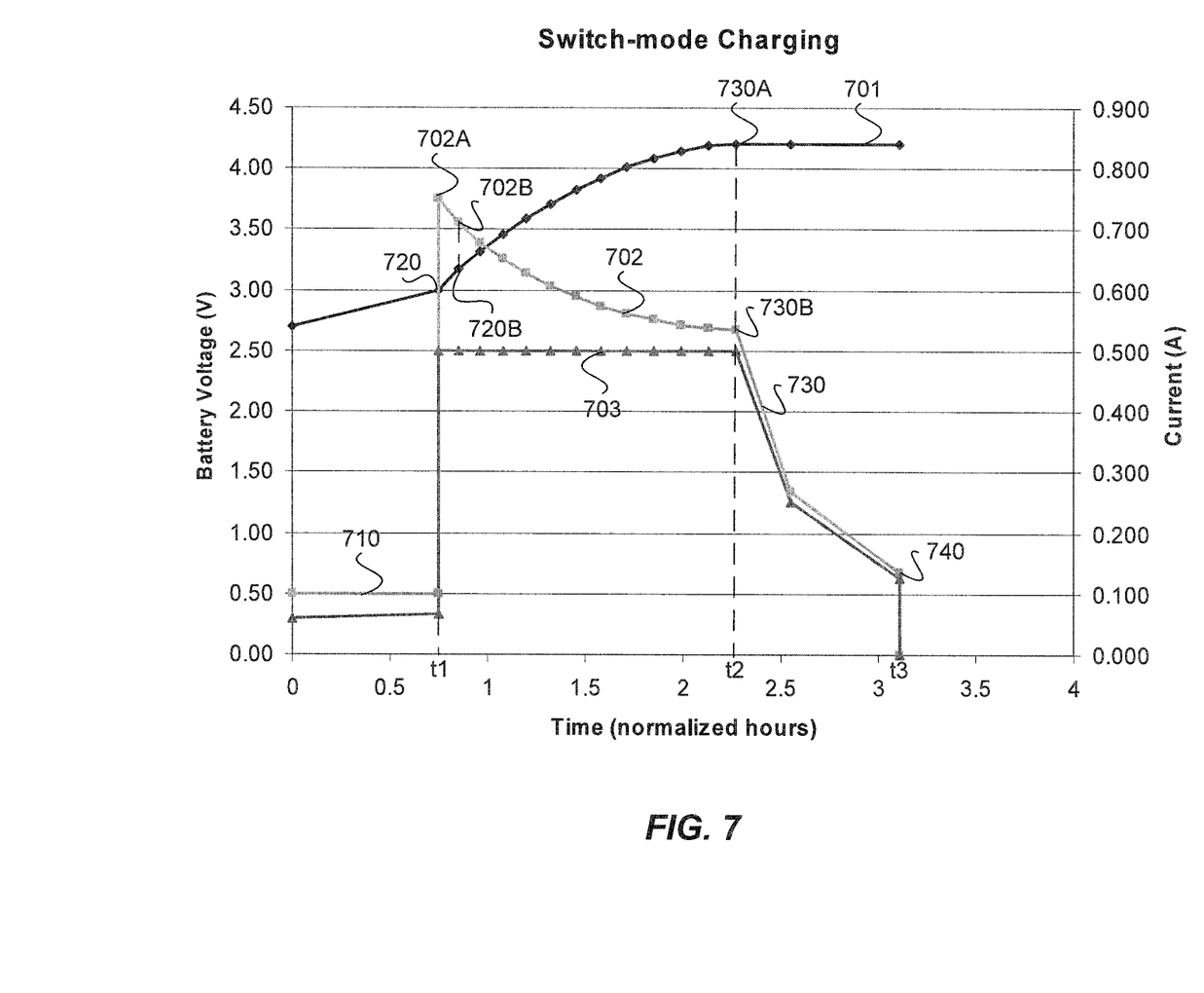
FIG. 7 illustrates an example of a battery charging technique using a switching regulator according to one embodiment of the present invention.

FIG. 7 illustrates an example of a battery charging technique using a switching regulator according to one embodiment of the present invention. The graph in FIG. 7 shows the current plotted on the right vertical axis and the voltage on the battery on the left vertical axis versus time on the horizontal axis. Voltage on the battery over time is shown by the line 701, current into the battery is shown by the line 702, and current into the switching regulator is shown by the line 703. This example illustrates a charge cycle for charging a deeply depleted Li+ battery. The battery is charged in two basic modes: a current control mode (t=0, t2) and a voltage control mode (t=t2, t3). In this example, the voltage on the battery is initially below some particular threshold (e.g., 3 volts), indicating that the battery is deeply depleted. Accordingly, the current control mode may initially generate a constant precharge current 710 (e.g., 100 mA). The constant precharge current 710 will cause the battery voltage to start to increase. When the battery voltage increases above a precharge threshold 720 (e.g., 3 volts), the system will increase the current sourced to the battery. The second current is sometimes referred to as the "fast charge" current.

As shown in FIG. 7, the current into the battery may be larger than the current received by the switching regulator. For example, at the beginning of the fast charge cycle, the current into the battery may be initially set at 750 mA, whereas the current into the switching regulator is 500 mA. Accordingly, the voltage on the battery will begin to increase as the battery is charged. As the battery voltage increases, the current into the battery may be reduced so that the input current remains approximately constant. As mentioned above, if the voltage on the battery increases, and if the current supplied by the switching regulator remains constant, the current into the switching regulator will begin to increase. In some applications it may be desirable to maintain the input current below some threshold values so that the total power into the switching regulator does not exceed the total power available at the power source. In this example, the input current is maintained approximately constant by controlling the switching regulator based on the combined duty cycle and output current describe above, and the current into the battery is reduced as the battery voltage increases. For instance, when the battery voltage increases above 3 volts at 720B, the current into the battery is reduced to about 700 mA. From FIG. 7 it can be seen that the current is successively decreased as the voltage on the battery increases to maintain the input current approximately constant. As mentioned above, the system may sense output current and duty cycle of the switching signal to implement battery current control.

When the voltage on the battery increases above a threshold 730A at time t2, the system may automatically transition to provide a constant voltage to the battery (i.e., the "float" voltage). When the battery increases to the float voltage during current control mode, the system will transition into voltage control mode and maintain the float voltage at the battery. While the system is in voltage control mode, the current 730 into the battery will begin to decrease (i.e., "taper" or "fall off"). In some embodiments, it may be desirable to turn off the charger after the current reaches some minimum threshold 740. Thus, when the battery current falls below a minimum value, the system may automatically shut down the charger and end the charge cycle at time t3.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method comprising:
sensing an output current of a switching regulator into a load;
generating a first signal representing a value of the output current of the switching regulator into the load;
determining a duty cycle of a switching signal of said switching regulator;
generating a second signal representing a value of the duty cycle of the switching signal;
generating a fourth signal representing a value of a reference voltage;
combining the first signal and second signal in a multiplier circuit and combining an output of the multiplier circuit with the fourth signal in a divider circuit to produce a third signal representing a value of an input current of said switching regulator; and
modifying the switching signal based on the third signal;
wherein the third signal representing the value of the input current is coupled to a control loop of the switching regulator to modify the switching signal.

2. The method of claim 1 wherein the third signal is a voltage, the method further comprising comparing the third signal to a reference voltage.

3. The method of claim 2 wherein the reference voltage is a voltage generated at an output of a digital-to-analog converter.

4. The method of claim 1 wherein the first signal is linearly related to the output current and wherein the second signal is linearly related to the duty cycle.

5. The method of claim 4 wherein generating the second signal comprises filtering the switching signal.

6. The method of claim 1 further comprising:
setting a maximum input current; and
controlling the switching regulator to maintain a constant input current when the third signal indicates that the input current is at a particular value.

7. The method of claim 1
wherein the load comprises a battery, wherein a voltage on the battery is less than a voltage at the input of the switching regulator, and wherein the input current to the switching regulator is less than the output current;
the method further comprising reducing the output current as the voltage on the battery increases such that the input current is held constant.

8. An apparatus comprising:
a switching regulator, the switching regulator generating a switching signal;
an output current sense circuit coupled to receive an output current of the switching regulator into a load, and in accordance therewith, generate a first signal representing a value of the output current of the switching regulator into the load;
a duty cycle measurement circuit coupled to receive the switching signal, and in accordance therewith, generate a second signal representing a value of the duty cycle of the switching signal; and
a control circuit comprising a multiplier circuit coupled to receive the first signal and second signal and combine the first signal and second signal to produce a third signal representing a value of an input current of said switching regulator, wherein the first signal is proportional to the output current and the second signal is proportional to the duty cycle, and wherein the multiplier circuit multiplies the first signal and second signal to generate the third signal that is proportional to the input current, the control circuit further comprising a divider circuit coupled to an output of the multiplier circuit, the divider circuit receiving the third signal and a fourth signal representing a value of a supply voltage to produce a fifth signal to modify the switching signal,
wherein the fifth signal is coupled to a control terminal of the switching regulator to modify the switching signal.

9. The apparatus of claim 8 wherein the duty cycle measurement circuit comprises a filter.

10. The apparatus of claim 9 wherein duty cycle measurement circuit comprises a voltage to current converter coupled to the output of the filter.

11. The apparatus of claim 8 further comprising a digital to analog converter coupled to a differential amplifier to program a maximum output current to the switching regulator, wherein a sixth signal representing the value of the output current is coupled to the control terminal of the switching regulator through the differential amplifier.

12. The apparatus of claim 11 wherein the digital to analog converter is coupled to an input of the differential amplifier and the sixth signal is coupled to the input of the differential amplifier.

13. The apparatus of claim 11 wherein the digital to analog converter is coupled to a first input of the differential amplifier and the sixth signal is coupled to a second input of the differential amplifier.

14. The apparatus of claim 8 further comprising a digital to analog converter coupled to an output of the control circuit and to an input of a differential amplifier to program a maximum input current, wherein the fifth signal is coupled to the control terminal of the switching regulator through the differential amplifier.

15. The apparatus of claim 8 further comprising a digital to analog converter coupled to a first input of a differential amplifier to program a maximum input current, wherein a second input of the differential amplifier is coupled to an output of the control circuit to receive the fifth signal, and wherein an output of the differential amplifier is coupled to the control terminal of the switching regulator to modify the switching signal.

16. An apparatus comprising:
a switching regulator, the switching regulator generating a switching signal;
means for sensing an output current of the switching regulator into a load and for generating a first signal representing a value of the output current of the switching regulator into the load; and
means for determining a duty cycle of the switching signal coupled to receive the switching signal and for generating a second signal representing a value of the duty cycle of the switching signal;
means for generating a fourth signal representing a value of a reference voltage;
a multiplier circuit to combine the first signal and second signal; and
a divider circuit to combine an output of the multiplier circuit with the fourth signal to produce a third signal representing a value of an input current of said switching regulator,
wherein the third signal representing the value of the input current is coupled to a control loop of the switching regulator to modify the switching signal.

17. The apparatus of claim 16 further comprising means for modifying the duty cycle of the switching regulator based on the third signal.

18. The apparatus of claim 16 wherein the load comprises a battery, wherein a voltage on the battery is less than a voltage at an input of the switching regulator, and wherein the input current to the switching regulator is less than the output current, the apparatus further comprising means for reducing the output current as the voltage on the battery increases such that the input current is held constant.

19. The method of claim 1 wherein the first signal is one of a voltage signal or a current signal, the second signal is one of a voltage signal or a current signal, and the third signal is one of a voltage signal or a current signal.

20. The method of claim 1 further comprising coupling the first signal representing the value of the output current into the load and the third signal representing the value of the input current to the same node to alternatively control the switching regulator.

21. The method of claim 6 further comprising programming a digital-to-analog converter to generate a voltage to set the maximum input current.

\* \* \* \* \*